United States Patent [19]

Abner

[11] 4,171,834

[45] Oct. 23, 1979

[54] DEVICE FOR CONNECTING CORRUGATED DRAINAGE TILES AND THE LIKE

[76] Inventor: Larry D. Abner, R.R. 1, Norman, Ind. 46264

[21] Appl. No.: 902,756

[22] Filed: May 3, 1978

Related U.S. Application Data

[63] Continuation-in-part of Ser. No. 755,152, Dec. 24, 1976, Pat. No. 4,084,844.

[51] Int. Cl.² ............................................. F16L 21/06
[52] U.S. Cl. .................................... 285/373; 285/423; 285/DIG. 4; 285/DIG. 22
[58] Field of Search ............... 285/407, 408, 409, 410, 285/373, 419, 424, 260, DIG. 4, 254, 179, 176, 37, 364, 365, 366, 367, 243, 420, 423, DIG. 22; 24/279, 201 C, 16 PB; 138/121, 166, 168, 97, 99; 61/10–13

[56] References Cited

U.S. PATENT DOCUMENTS

| | | | |
|---|---|---|---|
| 3,161,210 | 12/1964 | Loof | 285/DIG. 22 |
| 3,239,254 | 3/1966 | Campbell | 285/424 X |
| 3,518,727 | 7/1970 | Eberle et al. | 24/16 PB |
| 3,633,947 | 1/1972 | Nelson | 285/DIG. 22 |
| 3,699,684 | 10/1972 | Sirt | 285/373 |
| 3,899,198 | 8/1975 | Maroschak | 285/DIG. 4 |
| 3,964,774 | 6/1976 | Wollin | 285/409 |
| 4,084,844 | 4/1978 | Abner | 285/423 |

FOREIGN PATENT DOCUMENTS

| | | | |
|---|---|---|---|
| 769622 | 10/1967 | Canada | 285/419 |
| 1223125 | 1/1960 | France | 24/16 PB |

Primary Examiner—Dave W. Arola
Attorney, Agent, or Firm—Woodard, Weikart, Emhardt & Naughton

[57] ABSTRACT

Disclosed herein is a device for connecting corrugated drainage tiles and the like which comprises a sleeve member which fits around the adjacent ends of coaxial drainage tiles. The sleeve member includes tabs which extend from a first side of the sleeve member and are received within the external, circumferential channels in the drainage tiles. One end of the sleeve member includes connecting tabs which are adapted to be received within openings located at the end of the sleeve member. The sleeve member may thereby be positioned about the adjacent drainage tiles and the ends of the sleeve member are secured together by insertion of the connecting tabs into the respective openings in the sleeve member.

5 Claims, 6 Drawing Figures

U.S. Patent Oct. 23, 1979 Sheet 1 of 3 4,171,834
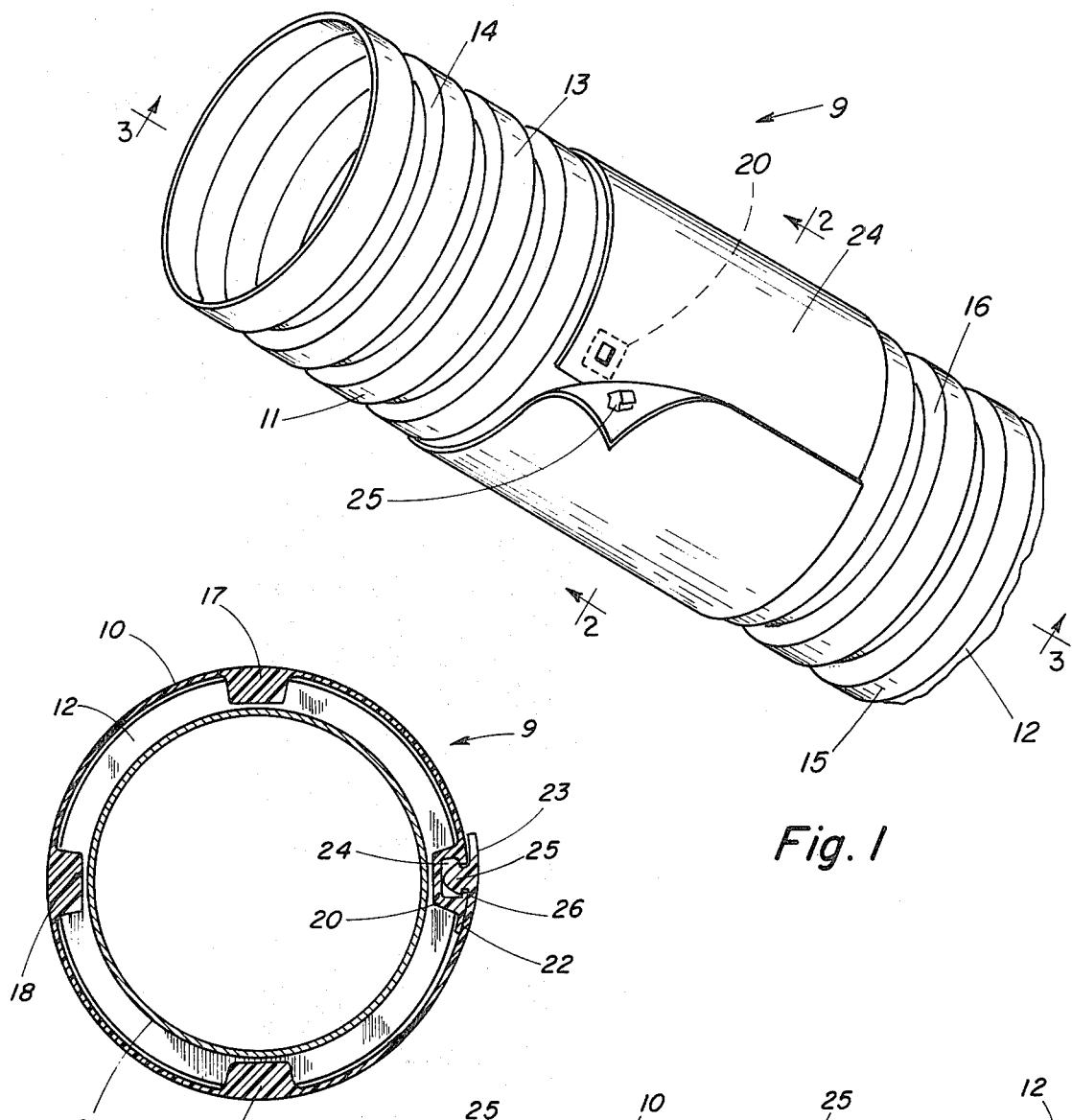
Fig. 1
Fig. 2
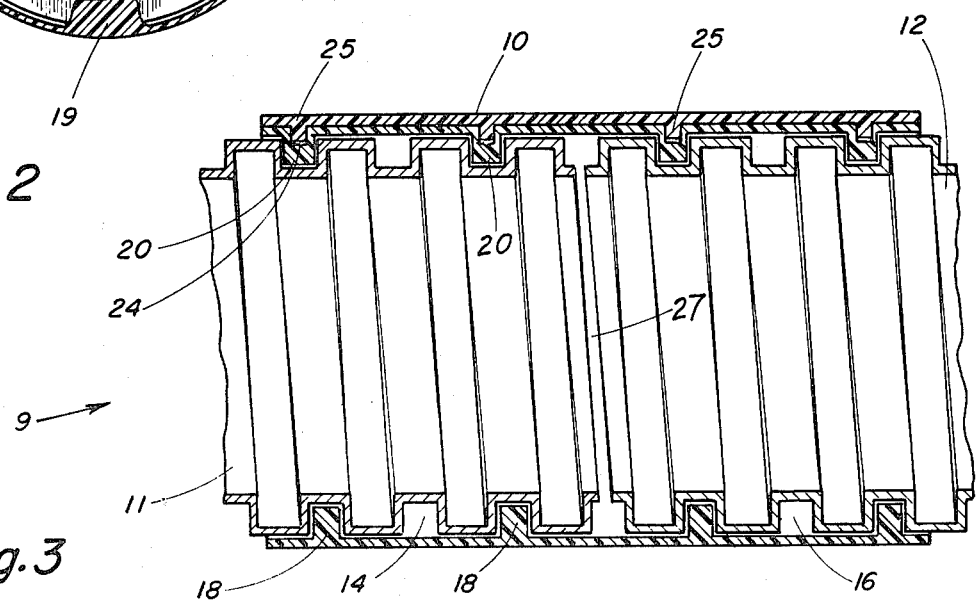
Fig. 3

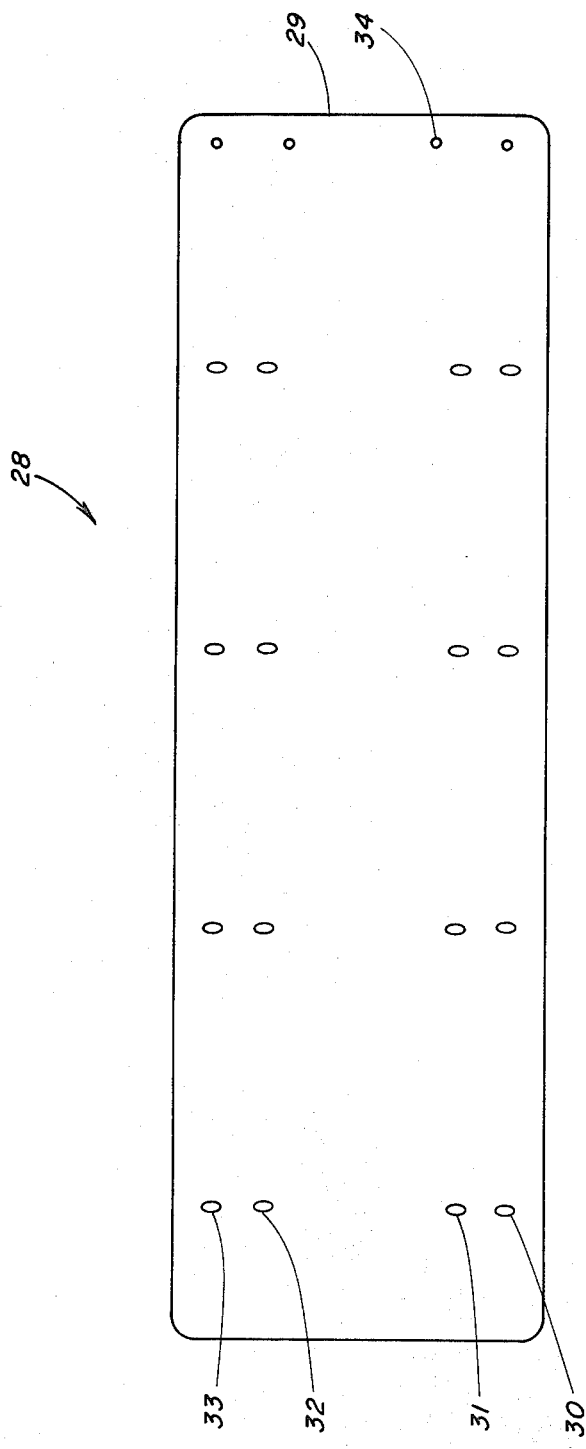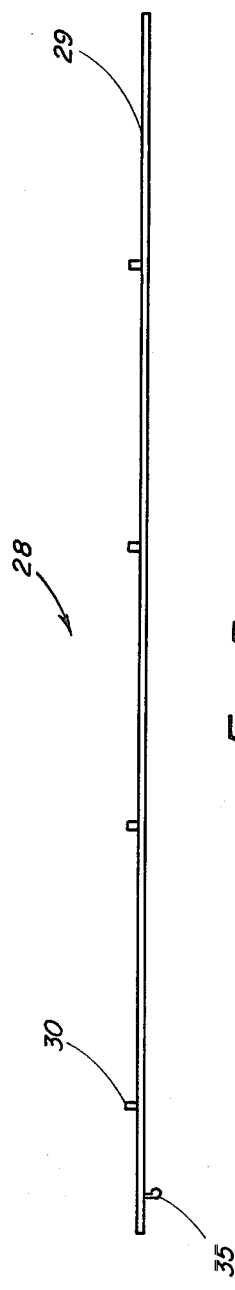

DEVICE FOR CONNECTING CORRUGATED DRAINAGE TILES AND THE LIKE

CROSS-REFERENCE TO RELATED APPLICATION

This is a continuation-in-part to Ser. No. 755,152, filed Dec. 24, 1976 now U.S. Pat. No. 4,084,844, entitled DEVICE FOR CONNECTING CORRUGATED DRAINAGE TILES AND THE LIKE.

BACKGROUND OF THE INVENTION

1. Field of the Invention

The present invention relates to a device for connecting coaxial drainage tiles and the like, and more particularly to a device of this type which is especially adapted to connect corrugated drainage tiles.

2. Description of the Prior Art

It is frequently required that coaxial pipes or tubes be joined at their adjacent ends to provide structural stability and to seal the points of connection. Field or drainage tile, for example, are conventionally used for farm drainage and are coupled together to provide a relatively long drainage conduit. It is desirable to secure the individual segments of the overall drain conduit in order to retain the coaxial alignment of the adjacent tubes, and also to prevent excessive leaking at the points of connection of the separate segments.

A number of specific devices have been devised for joining together coaxial tube sections. A typical tubing coupler comprises a band clamp which spans about the adjacent portions of the tubes and is tightened against the tubes by the operation of a lever arm. The adjacent tubes are then prevented from moving apart due to the clamp being tensioned around each of the tubes. In U.S. Pat. No. 3,964,774, issued to Wollin et al. on June 22, 1976, there is disclosed a clamp of this type which includes a lever mechanism for tightening the clamp members around adjacent annular flanges on separate tube sections. Several other patents disclose a tube coupler which comprises a band or other member which extends about the tubes and has opposite ends which are drawn together to provide a frictional fit of the band to the tubes, but these are as equally irrelevant as the Wollin et al. patent.

The present invention relates to a device for coupling drainage tiles and the like which have circumferential channels, such as would exist for corrugated tubing. The clamps disclosed in the above-cited patents are generally not well suited to use with corrugated drainage tiles and the like. First, the corrugations make it more difficult for the band-type clamps to be properly positioned adjacent the two connected tubes. In addition, the band clamps do not provide for preventing axial displacement of the joined tubes other than by the frictional engagement of the band with the tubes. The present invention utilizes the existing circumferential channels on corrugated tubes to advantage by using the channels to facilitate placement of the coupling device upon the adjacent tubes and to provide resistance to axial displacement of the tubes after the device is secured thereon.

In Canadian Pat. No. 769,622, issued to Hale et al. on Oct. 17, 1967, there is disclosed a grooved pipe coupling which includes a coupling member which spans the circumference of the adjacent pipes. The Hale et al. device does include upraised portions which are positioned to be received within the grooves in the sections of pipe. The Hale et al. coupling includes clamping members which are fixed to the ends of the coupling member and which may be pulled toward one another by operation of a pair of bolts and nuts which extend between the clamping members. Although the Hale et al. coupling does provide for substantial coupling of adjacent pipes, the coupling is disadvantageous in that it includes several separate elements which are involved in the clamping action. Moreover, the particular clamping mechanism utilized in the Hale et al. coupling requires the use of a nut which is threaded onto a bolt to effect the clamping action, and this may be disadvantageous if the coupling is used outdoors and is desired to be removed at a later date, since the exposure of the nut and bolt to the outdoors may prevent the ready separation of the coupling.

Other coupling mechanisms are disclosed in U.S. Pat. Nos. 3,161,310, issued to Loof on Dec. 15, 1964; U.S. Pat. No. 3,518,727, issued to Everle et al. on July 7, 1970; U.S. Pat. No. 3,699,684, issued to Sixt on Oct. 24, 1972; U.S. Pat. No. 3,633,947, issued to Nelson on Jan. 11, 1972; and U.S. Pat. No. 3,239,254, issued to Campbell on Mar. 8, 1966. Each of the preceding patents discloses a coupling member which is wrapped about a portion or all of the circumference of the two coaxially-aligned pipes. However, none of these patents discloses or teaches the structure of the present invention utilized for connecting the ends of the coupling member to one another. The coupling member of the Sixt patent spans only a portion of the circumference of the coupled pipes. The coupling members of the Everle et al. and Nelson patents utilize channels or ridges which extend longitudinally of the coupling members, or in other words which may extend circumferentially about the pipes when the coupling member is in position about the pipes. The Loof device includes a coupling member which has a number of ridges which provide the connecting function for the two ends of the coupling member when one end of the coupling member is laid over the other end of the coupling member. The Campbell pipe coupling includes a coupling member which has apertures located at each of the two ends of the coupling member for reception of the connecting members, such as nuts and bolts. In U.S. Pat. No. 3,899,198, issued to Maroschak on Aug. 12, 1975, there is disclosed a cylindrical device utilized for coupling pipes coaxially by sliding the pipes into opposite ends of the coupling device. The Maroschak device does not include a coupling member which requires that the ends of the coupling member be joined subsequent to wrapping the coupling member about the coaxially pipes. Each of the coupling devices of the several patents cited herein include mechanisms different than that utilized by the present invention for connecting the free ends of the coupling member together after placement of the coupling member about the coaxial pipes.

SUMMARY OF THE INVENTION

A device is disclosed herein for coaxially connecting drainage tiles and the like having external, circumferential channels which comprises a sleeve member having a first end and a second end, the sleeve member including a plurality of spaced apart tabs extending from one side of the sleeve member and adapted to be received within the circumferential channels in corrugated drainage tiles, and means for securing the first end of the sleeve member adjacent to the second end of the sleeve member to secure the sleeve member about corrugated drainage tiles with the tabs received within the circumferential channels of the corrugated drainage tiles. In the present invention, the first end of the sleeve member includes a plurality of connecting tabs and the second end of the sleeve member includes a plurality of apertures positioned to receive the connecting tabs therein upon placement of the sleeve member about coaxially-aligned drainage tiles.

A method is also disclosed herein for coaxially connecting drainage tiles and the like which have external, circumferential channels, the method comprising the steps of placing the drainage tiles together coaxially, positioning a sleeve member to surround the drainage tiles, the sleeve member including at least one tab received within the circumferential channels of one of the drainage tiles and at least one tab received within the circumferential channels of the other of the drainage tiles, the sleeve member having a first end and further having a second end located adjacent the first end when the sleeve member is placed about the drainage tiles, and securing the first end of the sleeve member to the second end of the sleeve member.

It is an object of the present invention to provide a simple and inexpensive device for coaxially coupling corrugated drainage tiles and the like.

Another object of the present invention is to provide a device for joining together the ends of coaxial, corrugated tubes in a manner to prevent axial displacement of the tubes and to reduce the leakage of fluid through the seam between the adjacent tubes.

It is a further object of the present invention to provide a device for connecting coaxial drainage tiles and the like which may be easily and quickly installed and removed.

Further objects and advantages of the present invention will become apparent from the description of the preferred embodiment which follows.

BRIEF DESCRIPTION OF THE DRAWINGS

FIG. 1 is a perspective view of coaxial, drainage tiles joined together by one embodiment of the present invention.

FIG. 2 is a cross-sectional view of the embodiment of FIG. 1, taken along line 2—2 in FIG. 1.

FIG. 3 is a cross-sectional view of the embodiment of FIG. 1, taken along line 3—3 of FIG. 1.

FIG. 4 is a top, plan view of an alternate embodiment of the present invention.

FIG. 5 is a side, elevational view of the embodiment of FIG. 4.

DESCRIPTION OF THE PREFERRED EMBODIMENT

Figure 6:
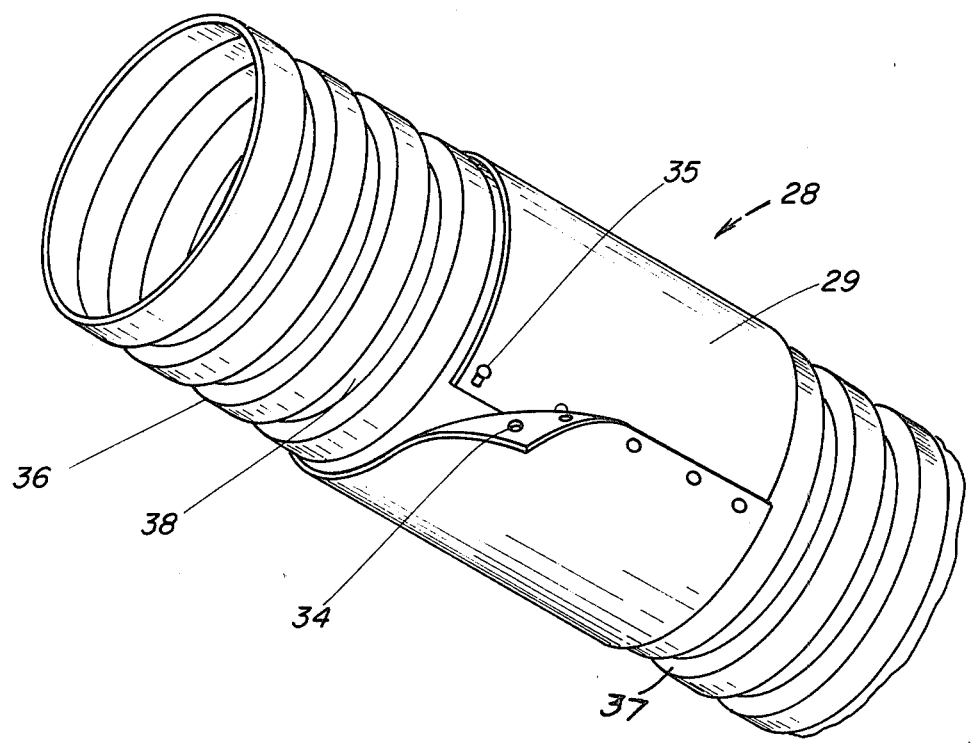
FIG. 6 is a perspective view of the coupling of FIG. 4 shown positioned about a pair of coaxially-aligned drainage tiles.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In many circumstances it is desirable to coaxially couple sections of tubing to provide a relatively long conduit. As previously related, many devices have been proposed for facilitating the coupling of adjacent tube sections. The present invention is directed at a device that is of simple construction and is easily used and which provides for coupling drainage tiles and the like having external, circumferential channels. Corrugated drainage tile, for example, falls into this class and is commonly used to provide farm drainage by laying sections of the tiles in a trench and connecting the sections together. The present invention has a particular application to the connection of drainage tile sections, and more broadly applies to a device for coupling tube sections having external, circumferential channels.

Referring now to the figures, there is shown a combination 9 of corrugated drainage tiles 11 and 12 secured coaxially by sleeve member 10 in accordance with the present invention. Drainage tiles 11 and 12 are positioned coaxially and have adjacent ends at location 27 (FIG. 3). Sleeve member 10 is positioned to surround the adjacent end portions of drainage tiles 11 and 12. As will be more fully described below, sleeve member 10 couples together the drainage tiles 11 and 12 and seals the junction of the tiles.

Drainage tile 11 includes external, circumferential channels 14 defined by spaced apart, circumferential ridges 13. Similarly, drainage tile 12 includes circumferential channels 16 defined by spaced apart ridges 15. Sleeve member 10 includes a plurality of tabs 17-20, all of which extend from the same side of sleeve member 10. Tabs 17-20 are shaped and positioned to be received within the circumferential channels 14 and 15 of drainage tiles 11 and 12, respectfully. Tabs 17-20 cooperate with ridges 13 and 15 to prevent axial displacement of drainage tiles 11 and 12 while sleeve member 10 is positioned about the drainage tiles.

Sleeve member 10 includes a first end 22 (FIG. 2) which is connected adjacent to second end 23 (FIG. 2) to secure sleeve member 10 about drainage tiles 11 and 12. The provision of these separable ends 22 and 23 permits sleeve member 10 to be readily installed upon or removed from adjacent drainage tiles without the need for separating the tiles to permit the sleeve member to be slid onto or off of one of the tiles.

Means are provided for connecting first end 22 adjacent to second end 23. This connecting means preferably incorporates some of the tabs included on the sleeve member 10, although other known securement means could be employed for this purpose. In the preferred embodiment, sleeve member 10 includes tabs 20 located adjacent to first end 22 and extending from a first side of sleeve member 10 to be received within the circumferential channels of the drainage tiles. Tabs 20 are hollow and thereby define interior chambers 24 (FIG. 2) which open out onto the second side of sleeve member 10 through openings 26. Sleeve member 10 additionally includes tabs 25 located adjacent second end 23, and positioned and shaped to be received within respective interior chambers 24 of tabs 20. As shown in FIG. 2, tabs 25 are preferably provided with enlarged head portions which are greater in size than the respective openings 26, thereby locking the tabs within the interior chambers 24 upon insertion beyond openings 26. Insertion of tabs 25 into the interior chambers 24 of the tabs 20 secures sleeve member 10 in position surrounding the adjacent ends of drainage tiles 11 and 12, thereby coupling the drainage tiles to maintain alignment of the tiles and to seal the junction or seam between the adjacent tiles.

Although a particular, preferred embodiment of the present invention has been described, various modifications of the described device could be made which would fall within the purview of the present invention. For example, tabs 17–20 are shown to be generally rectangular and spanning only a small distance of the circumference of the drainage tiles. These tabs could, however, be modified to be greater in length, and in fact, a single short tab or one which would span essentially the entire circumference of the drainage tiles could be employed. Similarly, the number and spacing of the tabs could be varied from that shown. In addition, tabs 17–20 are shown (FIG. 2) to extend into the channels but not to abut the bottoms 21 of the channels. The tabs could be made to extend more radially inward to engage the channel bottoms 21, although this is less preferred. It is preferred that sleeve member 10 include tabs received within two channels on each of the drainage tiles, although tabs being received within only one channel of each drainage tile would suffice. The material from which sleeve member 10 and tabs 17–20 and 25 are made is advantageously selected to suit the particular environment in which the device will be employed. Sleeve member 10 and tabs 17–20 and 25 are, however, preferably formed, as by molding, as an integral unit from a plastic or other material having sufficient flexibility and durability.

In accordance with the method of the present invention, tubes having external, circumferential channels are conveniently and efficiently connected by installation of a tabbed sleeve member of the described type. The drainage tiles or other tubes are first aligned coaxially with the ends being adjacent. Sleeve member 10 is then positioned to surround the drainage tiles 11 and 12 with tabs 17–20 being received within the circumferential channels 14 and 16 of the drainage tiles 11 and 12, respectfully. Second end 23 of sleeve member 10 is then connected adjacent to and overlapping first end 22 by insertion of tabs 25 within the interior chambers 24 of tabs 20.

Referring in particular to FIGS. 4–6 there is shown an alternate embodiment of the present invention. The alternate embodiment comprises a sleeve member 28 including a normally flat, semi-rigid sheet 29 having tabs, such as 30–33 extending from one side thereof. A plurality of connecting tabs, such as 35, extend from the opposite side of sheet 29 and are positioned adjacent one end of the sheet. A plurality of apertures, such as 34, are defined by the sheet 29 at the opposite end of sleeve member 28. The connecting tabs 35 and apertures 34 are positioned to provide for the connecting tabs to be received within respective apertures when the sleeve member 28 is wrapped about coaxially-aligned drainage tiles and the like. As particularly shown in FIG. 6, and as previously described, drainage tiles or similar articles include ridges, such as 36, and channels, such as 37 and 38. The tabs 30–33 are positioned to be received within channels in the aligned drainage tiles and the like, and the reception of the connecting tabs 35 within the respective apertures 34 secures the sleeve member 23 about the tiles and thereby secures the connection of the aligned tiles.

As previously described, the sleeve members of the present invention are preferably formed as by molding, as integral units comprising a plastic or other similar material having sufficient flexibility and durability. It is a particular feature of the present invention that the sheet 29 be formed to normally be a flat body which is subsequently wrapped around the drain tiles and the like to effect the described connection. Many prior art couplings have included sleeve members which were preformed into a cylinder which then had to be axially inserted upon the respective drainage tiles, whereas others included coupling mechanisms which added to the bulkiness of the coupling prior to and during use. In contrast, the present invention is preferably molded into a flat sheet having only the specified tabs and connecting tabs extending from the sides of the sheet. In this manner, the couplings are readily handled and easily shipped and stored in very small units. The use of the connecting tabs and respective apertures provides a coupling mechanism for the ends of the sleeve member 28 which is reliable and effective, while not being bulky and while not including moving parts which after exposure to the outdoors would "freeze up" and prevent removal and reuse of the coupling.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A device for coaxially connecting drainage tiles and the like having external, circumferential channels which comprises:

a sleeve member having a first end and a second end, said sleeve member including a plurality of spaced apart tabs extending from a first side of said sleeve member and adapted to be received within the circumferential channels in coaxial, corrugated drainage tiles; and means for securing the first end of said sleeve member adjacent to the second end of said sleeve member to secure said sleeve member about the corrugated drainage tiles with the tabs received within the circumferential channels of the corrugated drainage tiles, said securing means including extensions located adjacent the first end of said sleeve member and extending from the second side of said sleeve member, said securing means further including apertures defined by said sleeve member and adjacent said second end of said sleeve member, the apertures being positioned to receive therein respective extensions.

2. The device of claim 1 in which the extensions include enlarged head portions greater in size than the respective apertures in which they are received, whereby the extensions are held within the respective apertures when the enlarged head portions are inserted through the respective apertures.

3. The device of claim 2 in which said sleeve member includes a plurality of tabs spaced along the length between the first and second ends of said sleeve member and further includes a plurality of tabs spaced along the width of said sleeve member, each of the tabs being adapted to be received within circumferential channels in corrugated drainage tiles.

4. The device of claim 1 in which said sleeve member includes a normally-flat sheet of semi-rigid material.

5. The device of claim 4 in which the tabs and the extensions are formed integrally with the sheet of material.

* * * * *